United States Patent
McNally

(10) Patent No.: US 7,121,586 B2
(45) Date of Patent: Oct. 17, 2006

(54) METHOD OF JOINING CLOSED SECTION MEMBERS BETWEEN FRAME MODULES

(75) Inventor: John T. McNally, Berkley, MI (US)

(73) Assignee: Magna International Inc., Ontario (CA)

( * ) Notice: Subject to any disclaimer, the term of this patent is extended or adjusted under 35 U.S.C. 154(b) by 202 days.

(21) Appl. No.: 10/250,558

(22) PCT Filed: Jan. 10, 2002

(86) PCT No.: PCT/US02/00493

§ 371 (c)(1),
(2), (4) Date: Jul. 2, 2003

(87) PCT Pub. No.: WO02/055363

PCT Pub. Date: Jul. 18, 2002

(65) Prior Publication Data

US 2004/0056468 A1 Mar. 25, 2004

Related U.S. Application Data

(60) Provisional application No. 60/260,682, filed on Jan. 11, 2001.

(51) Int. Cl.
*B62D 21/02* (2006.01)
(52) U.S. Cl. ............ 280/797; 280/781; 280/785; 29/897.2; 228/165
(58) Field of Classification Search ............ 280/781, 280/785, 789–800; 29/897.2, 897.31, 897.35; 228/164, 173.4, 165, 170–173.3
See application file for complete search history.

(56) References Cited

U.S. PATENT DOCUMENTS

| | | | | |
|---|---|---|---|---|
| 1,547,263 A | * | 7/1925 | Pomeroy | 180/312 |
| 1,711,765 A | * | 5/1929 | Wright | 180/380 |
| 1,928,942 A | | 10/1933 | Maddock | |
| 2,228,740 A | | 1/1941 | Wagner et al. | |
| 2,809,050 A | * | 10/1957 | Bauer | 280/795 |
| 2,880,013 A | | 3/1959 | Dean | |
| 2,901,266 A | * | 8/1959 | Lindsay | 280/785 |
| 2,927,817 A | | 3/1960 | Raup | |
| 3,412,825 A | | 11/1968 | Hall | |
| 5,561,902 A | | 10/1996 | Jacobs et al. | |
| 5,632,508 A | | 5/1997 | Jacobs et al. | |
| 5,718,048 A | | 2/1998 | Horton et al. | |
| 5,725,247 A | | 3/1998 | Nilsson et al. | |
| 5,855,394 A | | 1/1999 | Horton et al. | |
| 6,003,935 A | | 12/1999 | Kalazny | |
| 6,010,155 A | | 1/2000 | Rinehart | |

FOREIGN PATENT DOCUMENTS

JP 2-164675 A * 6/1990

* cited by examiner

*Primary Examiner*—Ruth Ilan
(74) *Attorney, Agent, or Firm*—Pillsbury Winthrop Shaw Pittman LLP

(57) ABSTRACT

A frame assembly for a motor vehicle comprises a forward module and a rearward module. The forward module comprises a pair of forward side rail portions, which are interconnected by a cross portion. The forward side rail portions are angularly disposed with respect to one another such that they have an increasing distance therebetween as they extend rearwardly. Rearward ends of the forward side rail portions are connected to associated forward ends of the rearward side rail portions. At least one of the forward and rearward side rail portions has a notch formed therein permitting an end portion thereof to be bent laterally to permit interface with the associated side rail portion connected thereto. The end portion is then bent back and is welded to the associated side rail portion connected thereto.

21 Claims, 15 Drawing Sheets

METHOD OF JOINING CLOSED SECTION MEMBERS BETWEEN FRAME MODULES

This application is the National Phase of International Application PCT/US02/00493 filed Jan. 10, 2002 which designated the U.S. and that International Application was published in English under PCT Article 21(2) on Jul. 18, 2002 as International Publication Number WO 02/05536 A2. PCT/US02/00493 claims priority to U.S. Provisional Application No. 60/260,682 filed Jan. 11, 2001. The entire contents of these applications are incorporated herein by reference.

FIELD OF THE INVENTION

This invention relates in general to vehicle frames and more particularly to a modular vehicle frame.

BACKGROUND OF THE INVENTION

A vehicle ladder frame typically includes a pair of transversely spaced longitudinal side rails interconnected by a series of transverse cross members. Various vehicle subassemblies are mounted on the frame, such as the engine, passenger compartment, suspension, etc.

To enhance manufacturing efficiencies, some vehicle ladder frames are designed with a plurality of modular subassemblies. Each module subassembly typically includes two side rail frame portions interconnected by at least one cross portion. The modules are formed individually and have respectively associated vehicle components mounted thereon. The modules are then joined and connected together forming the full vehicle frame.

Since the modules are smaller and lighter than the whole of the vehicle frame, the modules are easier to manipulate in a manufacturing environment.

For some applications, it is desirable to provide frame side rails that have at least forward portions thereof disposed in angular relation with one another. In other words, at least the forward portions of the side rails are not parallel to one another, but rather are angled so as to have an increasing distance therebetween as they extend rearwardly. The angular configuration of the side rails increases structural performance of the frame for certain applications.

Because of the geometries and manufacturability problems involved, modularized ladder frame assemblies with angular forward side rail members have not been pursued.

Increased geometric and manufacturing difficulties for such an arrangement are also introduced when closed section side rail members are desired. Closed section or tubular side rail members are desirable, particularly towards the front end of a ladder frame, as such tubular frame members are more suitable for bearing the load of the vehicle engine.

SUMMARY OF THE INVENTION

It is an object of the present invention to provide a vehicle ladder frame that benefits from having both a modular construction and an angular side rail configuration, at least towards the front end thereof. In accordance with the principles of the present invention, this objective is achieved by providing a frame assembly for a motor vehicle that includes a forward module and a rearward module. The forward module has a pair of tubular forward side rail portions that are interconnected by a cross portion. The forward side rail portions are disposed at an angle with respect to one another such that they have an increasing distance between them as they extend rearwardly. The rearward module has a pair of tubular rearward side rail portions that are interconnected by a cross portion. Rearward ends of the forward side rail portions are connected to associated forward ends of the rearward side rail portions. At least one of the side rail portions has a notch formed therein to enable connection thereof to the side rail portion associatively connected therewith. The notch permits an end portion of the at least one side rail portion to be bent laterally to permit interface with the associated side rail portion connected thereto and then be bent back to be welded to the associated side rail portion connected thereto.

It is a further object of the invention to provide a method of forming a modular frame assembly for a motor vehicle. This method is accomplished by providing a forward module that has a pair of forward side rail portions interconnected by a cross portion. The forward side rail portions are disposed at an angle with respect to one another such that they have an increasing distance therebetween as they extend rearwardly. A rearward module is also provided that has a pair of tubular rearward side rail portions that are interconnected by a cross portion. The forward module is then connected to the rearward module by, first forming a notch in an end of at least one of the side rail portions so as to form first and second split portions. The first split portion is then bent to widen the at least one of the side rail portions to thereby enable the end of the at least one of the side rail portions to receive an associated end of an adjoining one of the side rail portions. Next, the first split portion is bent back to narrow the widened end of the at least one of the side rail portions. The forward ends of the rearward side rail portions are then welded to rearward ends of the forward side rail portions.

It is a further object of the invention to provide a method comprising constructing a forward module comprising a pair of forward side rail portions interconnected by a cross portion. The forward side rail portions are disposed at an angle with respect to one another such that the forward side rail portions have an increasing distance therebetween as they extend rearwardly. The forward side rail portions have associated rearward ends. The method includes constructing a rearward module comprising a pair of rearward side rail portions interconnected by a cross portion. The rearward side rail portions have associated forward ends. The method further includes connecting the forward module with the rearward module after the modules have been constructed. The connecting is accomplished by (a) bending at least one end of the ends so that the rearward ends of the forward side rail portions mate with the forward ends of the rearward side rail portions, and (b) welding the rearward ends to the forward ends.

DETAILED DESCRIPTION OF THE INVENTION

Figure 1A:
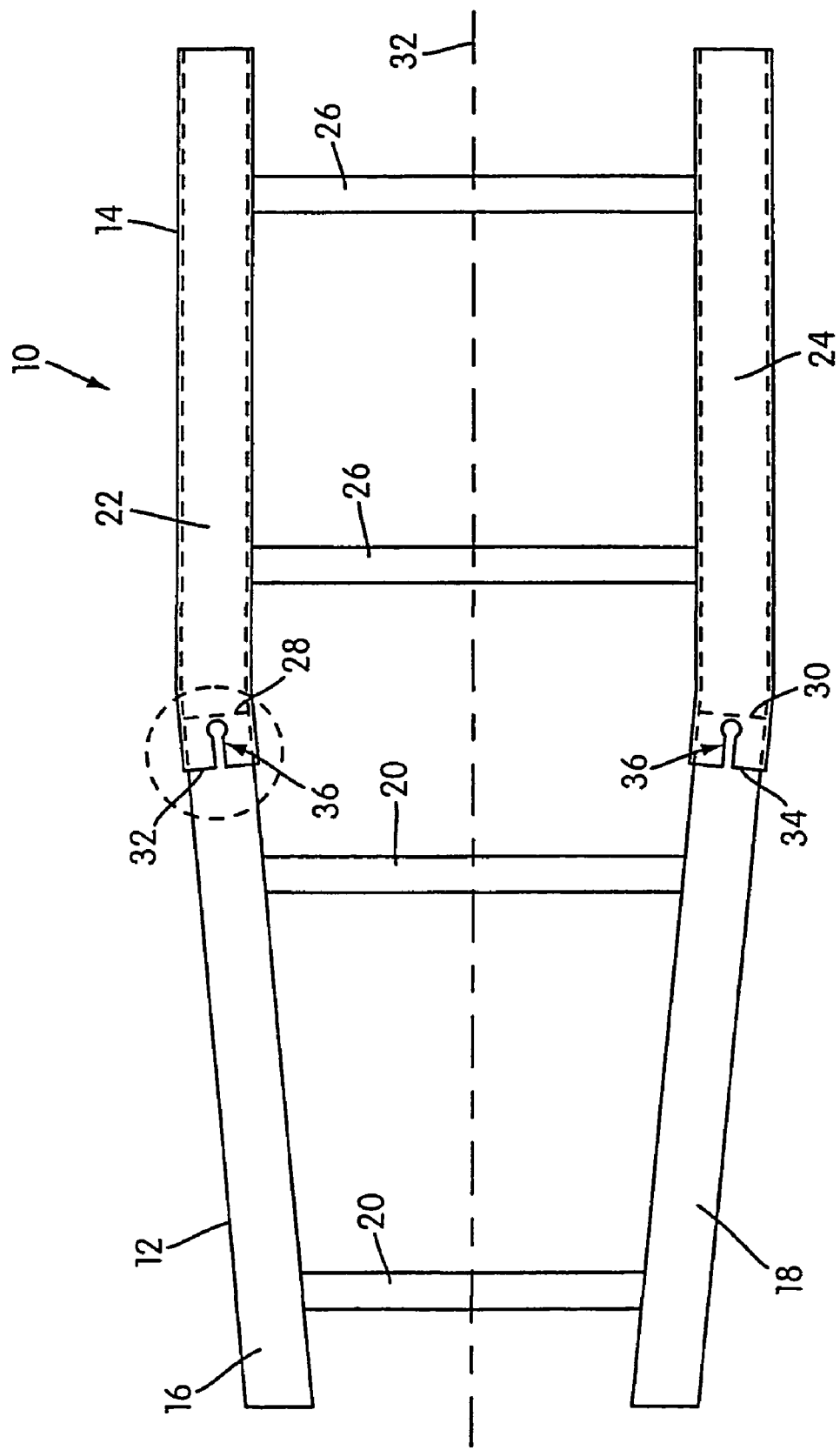
FIG. 1A is a top plan view of one embodiment of an angular modular vehicle frame assembly of the present invention.

FIG. 1A shows a frame assembly 10, embodying the principles of the present invention, which includes a forward module 12 and a rearward module 14. The forward module 12 has a pair of forward side rail portions 16, 18 that are interconnected by one or more cross portions 20. The forward side rail portions 16, 18 are disposed at an angle with respect to one another such that they have an increasing distance between them as they extend rearwardly. The rearward module 14 has a pair of rearward side rail portions 22, 24 that are interconnected by at least one cross portion 26. Rearward ends 28, 30 of the forward side rail portions 16, 18, respectively, are connected to associated forward end portions 32, 34 of the rearward side rail portions 22, 24, respectively. In the embodiment shown in FIGS. 1A–5, the forward end portions 32, 34 of the rearward side rail portions 22, 24 are provided with a notch 36 to enable connection of the rearward side rail portions 22, 24 with the forward side rail portions 16, 18, as will be described. The notch 36, shown in detail in FIG. 1C, permits first split portions 46 of the forward end portions 32, 34 of the rearward side rail portions to be bent laterally outwardly (splayed open) to permit interface with the associated rearward ends of the forward side rail portion connected thereto and then be bent back to be welded as will be described in greater detail later.

Figure 1B:
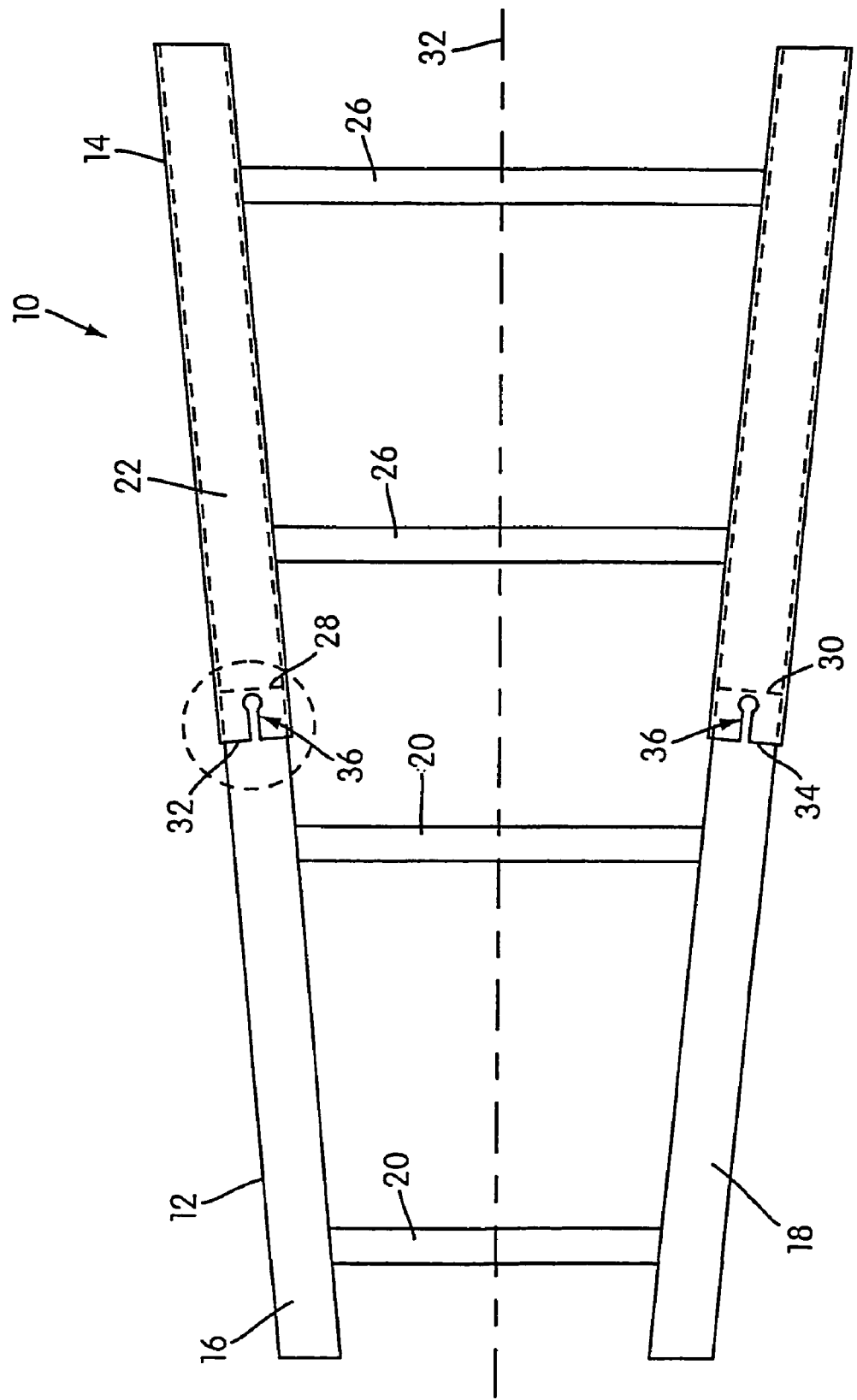
FIG. 1B is a top plan view of another embodiment of an angular modular vehicle frame assembly.
Figure 1C:
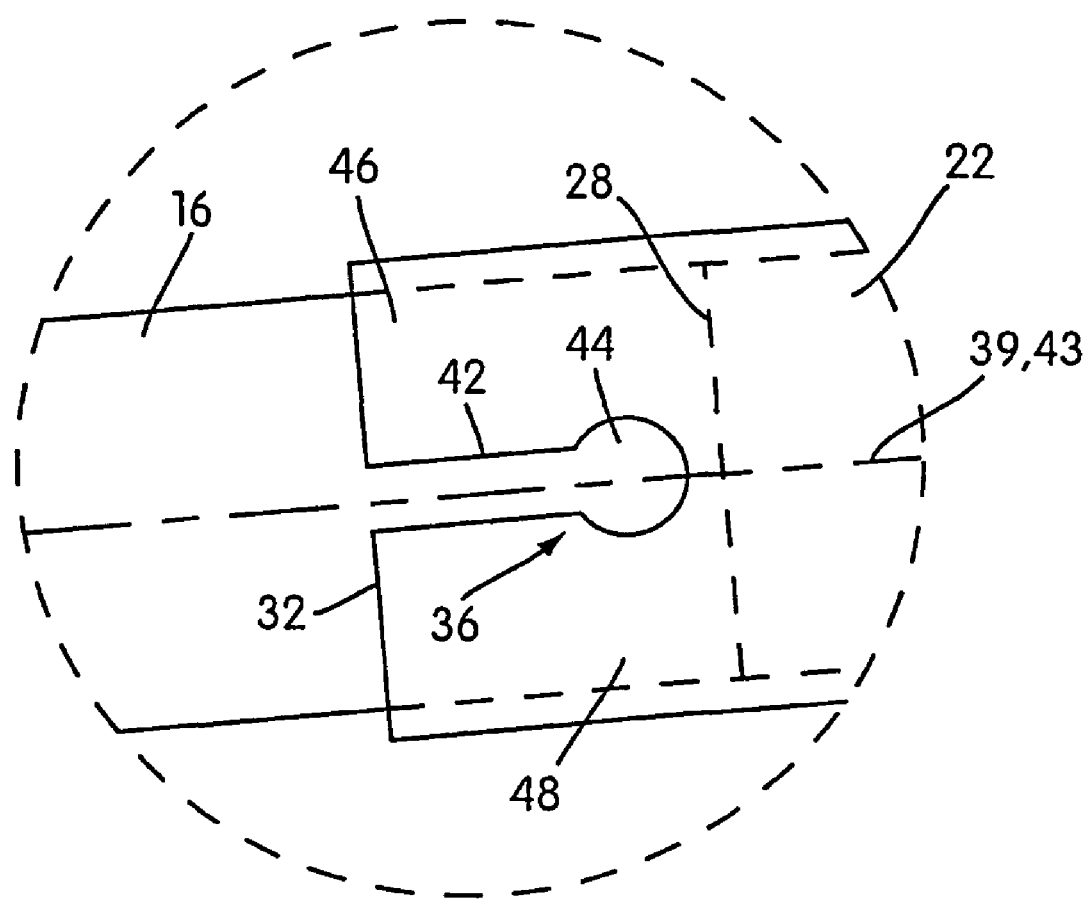
FIG. 1C is an enlarged view of the encircled portion indicated in FIGS. 1A and 1B.

In one embodiment, the entire extent of the rearward side rail portions 22, 24 are disposed at an angle with respect to one another such that they have an increasing distance between them as they extend rearwardly, as shown in FIG. 1B. The angle between rearward side rail portions 22 and 24 is the same angle as the forward side portions 16, 18 are disposed at with respect to each other. Alternately, as shown in FIG. 1A, it is contemplated that only the forward portions of the rearward side rails are disposed at an angle with respect to one another, such angle also being the same angle at which the forward side rails 16, 18 are disposed with respect to one another, with the greater extent of the rearward side rail portions 22, 24 being arranged generally parallel to each other. The forward and rearward modules 12, 14 are then formed by joining respective side rail portions to each other with associated cross portions. The forward and rearward side rail portions may be formed by a roll forming process. It is also contemplated that the forward and rearward side rail portions may be formed by a hydroforming process.

While side rails 22 and 24 are referred to here as "rearward," they need not be the rearwardmost side rails in the assembly 10. Rather, they are rearward in relation to the forward side rails 12, 14, and there may be yet additional side rail structures further rearwardly of side rails 22, 24.

Figure 2:
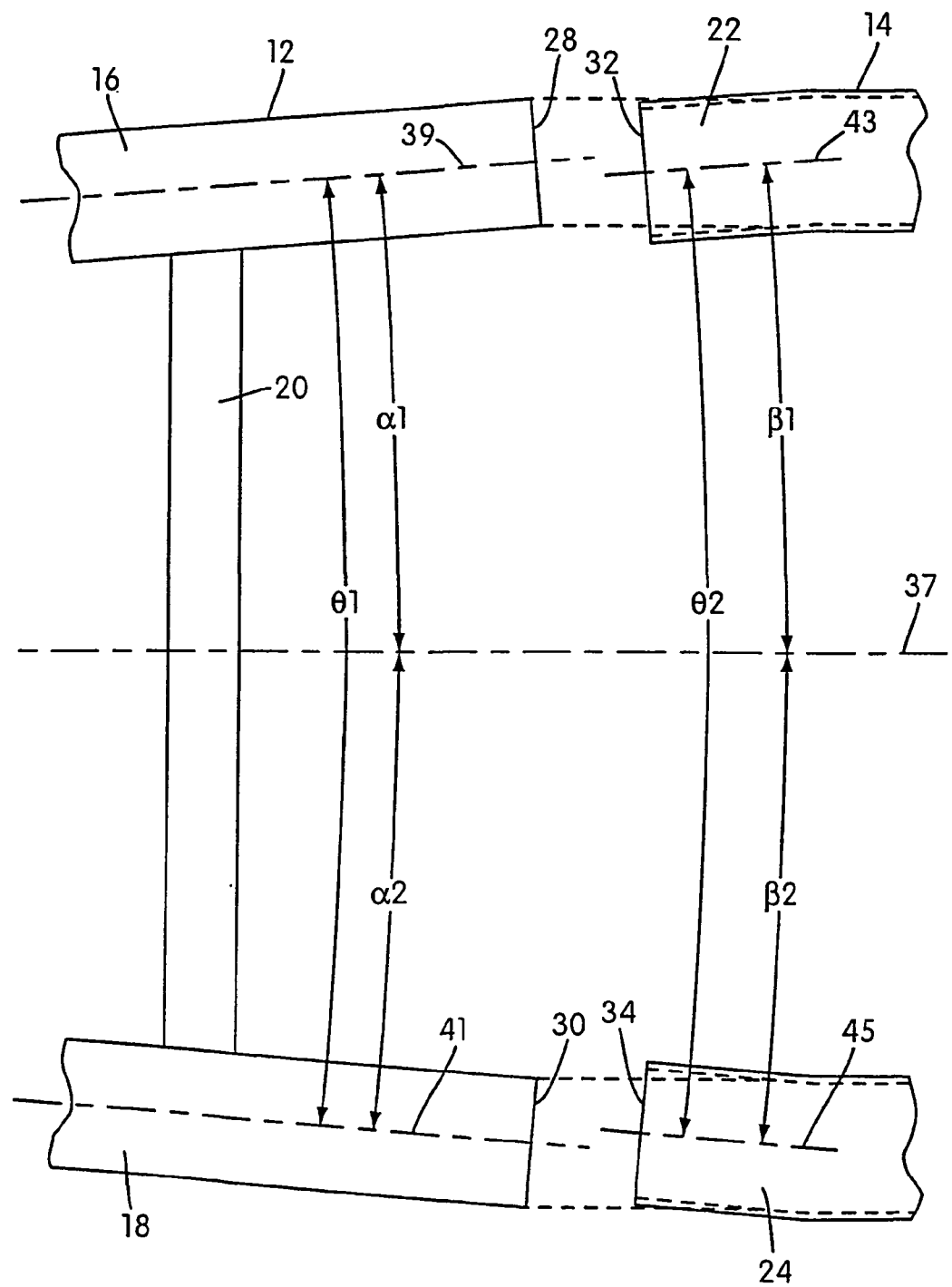
FIG. 2 is a partial top plan view of the forward and rearward modules of the modular vehicle frame assembly of FIG. 1A, shown prior to connection.

As shown in FIG. 2, forward side rail portions 16, 18 are rigidly connected to one another by cross portion 20. Cross portion 20 may be either a closed or an open-section member and is connected to each forward side rail portion 16, 18 preferably by a welding process. It is also contemplated that cross portion 20 may be connected to the side rail portions via fasteners, such as bolts. Alternatively, an integrally formed cross portion may be provided, for example in the instance in which a frame module is formed by a U-shaped tubular structure, such as one manufactured in a hydroforming operation. In such a U-shaped frame member, the bight portion comprises the laterally interconnected cross portion and is disposed towards the front of the vehicle, leaving the free rearward ends of the side rail portions extending rearwardly for connection with the rearward frame module side rail portions.

Forward side rail portions 16, 18 are configured with respect to one another so as to generally form an angle $\theta_1$ therebetween. An angle $\alpha_1$ is formed between a longitudinal axis 37 of the vehicle frame assembly and a central axis 39 of the forward side rail portion 16; and an angle $\alpha_2$ is formed between longitudinal axis 37 and a central axis 41 of forward side rail portion 18. The configuration of the side rail portions 16, 18 is such that $\alpha_1=\alpha_2$ and $\alpha_1+\alpha_2=\theta_1$.

Rearward side rail portions 22, 24 are rigidly connected to one another by cross portion 26, as shown in FIGS. 1A and 1B. Cross portion 26 may be either a closed or an open-section member and is connected to each rearward side rail portion 22, 24 preferably by a welding process. It is also contemplated that cross portion 26 may be connected to the side rail portions via fasteners, such as bolts or rivets. Shown in FIG. 2, the forward end portions 32, 43 are configured with respect to one another so as to form an angle $\theta_2$ between themselves. An angle $\beta_1$ is formed between longitudinal axis 37 and a centroidal axis 43 of forward end portion 32 and an angle $\beta_2$ is formed between longitudinal axis 37 and a central axis 45 of forward end portion 34. The configuration of the side rail portions 22, 24 is such that $\beta_1=\beta_2$ and $\beta_1+\beta_2=\theta_2$.

It is preferable for the forward and rearward modules to be configured and constructed such that angles $\theta_1$ and $\theta_2$ are substantially equal. It is contemplated, however, that $\theta_1$ and $\theta_2$ may differ by up to about 2°.

Figure 3A:
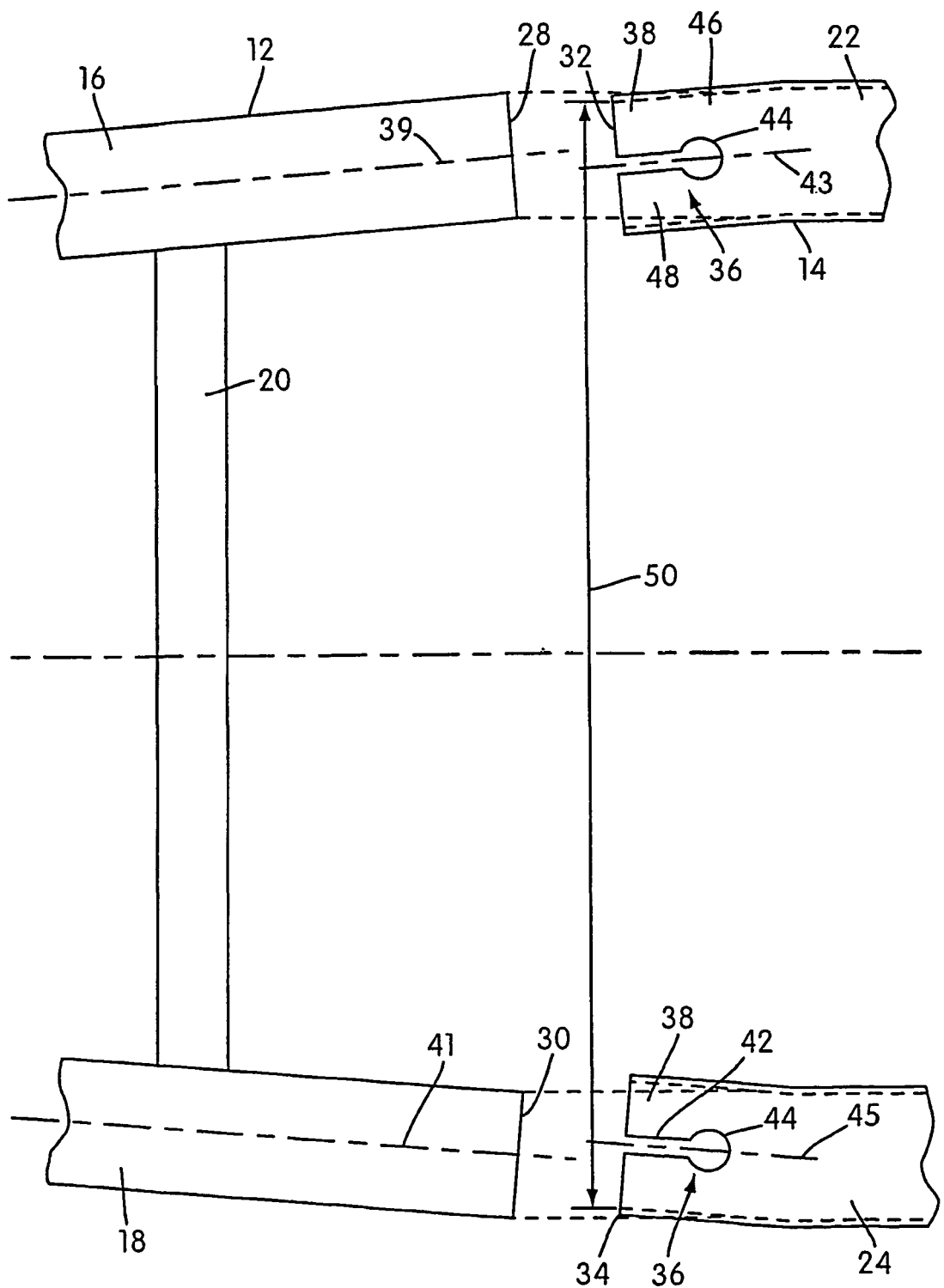
FIG. 3A is a partial top plan view of the rearward module shown in FIG. 2, with the notches formed within forward ends of the rearward side rail portions.

The notches 36, shown in FIG. 3A, are formed within the forward end portions 32, 34 of each of the rearward side rails 22, 24, respectively. The notches 36 extend vertically through upper and lower portions 38, 40 respectively, shown in FIG. 3B, of the forward end portions 32, 34. Referring to FIG. 3A, the notches 36 include a longitudinally extending (relative to the central axis 43, 45 of the associated forward end portions 32, 34) slot portion 42. A circular cut out 44 having a diameter that exceeds the transverse width of the slot portion 42 is formed at an innermost end of the slot portion 42 forming the notch 36 into a keyhole-shaped vertically extending opening in each rearward side rail portion 22, 24. The notch 36 provides first and second split portions 46, 48 relative to outer and inner sides (respectively) of the rearward side rail portions 22, 24.

Figure 3B:
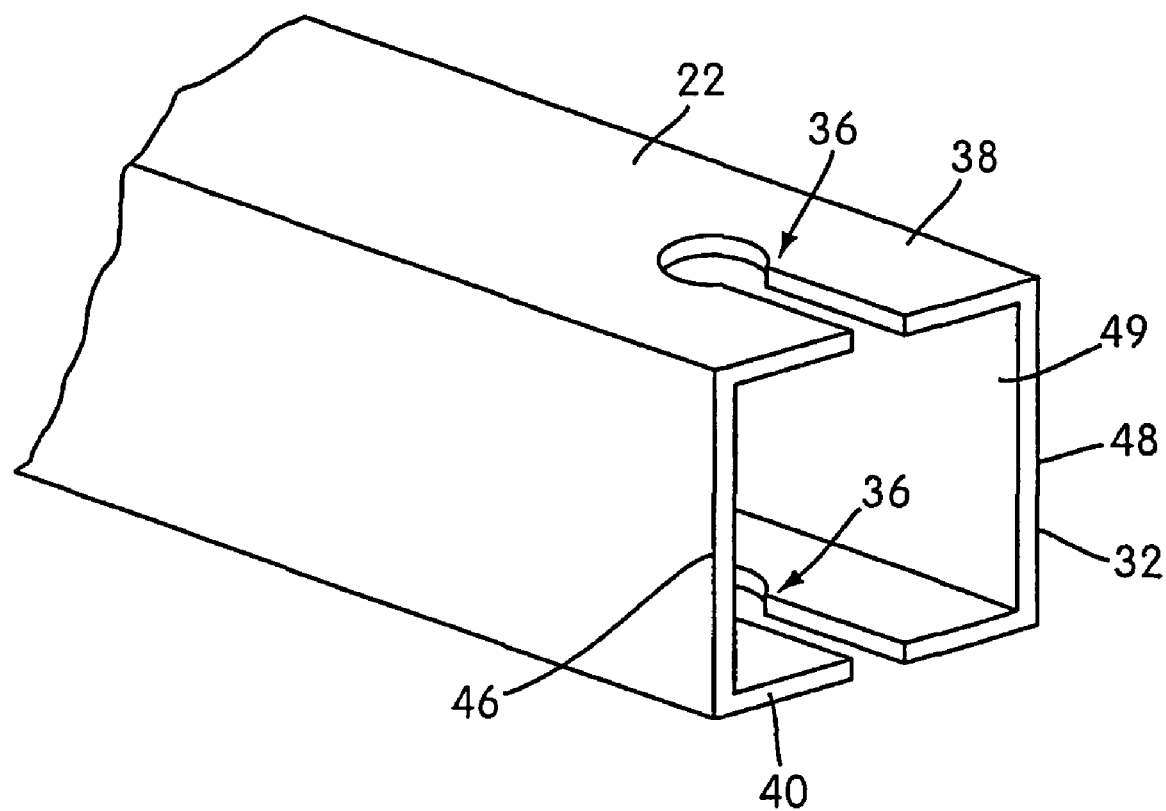
FIG. 3B is a perspective view of one forward end portion of an associated rearward side rail portion shown in FIG. 3A.
Figure 3C:
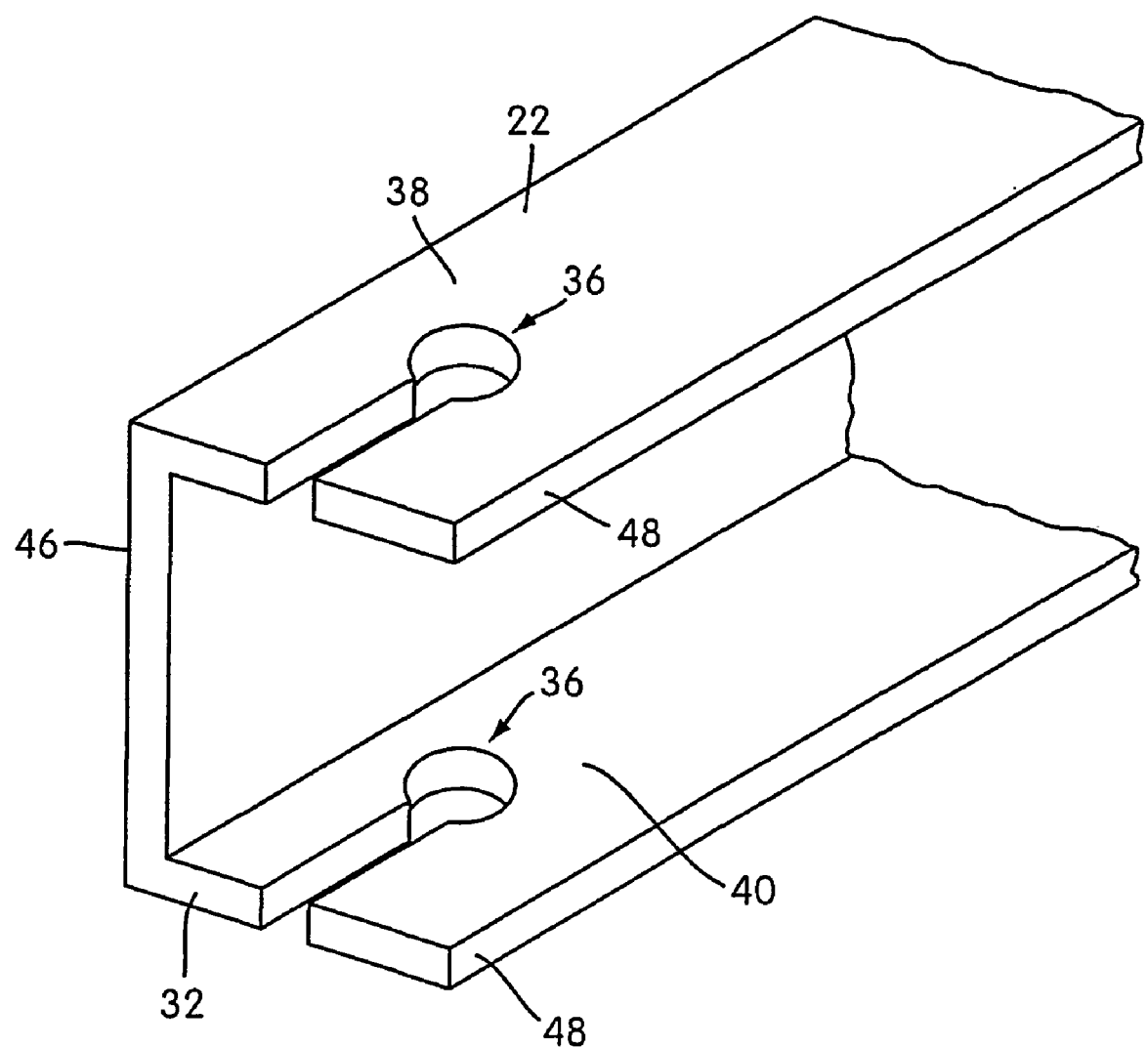
FIG. 3C is a perspective view of one forward end portion of an associated rearward side rail portion, wherein the side rail portion has a C-shaped sectional configuration.

Shown in FIG. 3B, longitudinal opening 49, defined by an inner periphery of rearward side rail portion 22, corresponds to an embodiment of the rearward side rail portions 22, 24 being constructed of tubular members having a generally rectangular cross section. It is noted that the forward side rail portions 16, 18 may also have a generally rectangular sectional configuration. Other embodiments of the forward and rearward side rail portions include other closed-section configurations, such as five-sided and irregularly shaped cross sections. The tubular side rail portions may be formed in a hydroforming operation, such as that described in U.S. Pat. No. 5,979,201, hereby incorporated by reference. It is also contemplated that forward and rearward side rail portions may be formed by a roll-forming process. It is also contemplated that open-section configurations may also be utilized for the rearward side rail portions, such as a C-shaped configuration, as shown in FIG. 3C, and other open-section configurations being open on one side. Forward and rearward modules 12, 14 are then formed by connecting respective side rail portions to each other with the cross portions. To ensure a secure connection between the forward side rail portions 16, 18 and the rearward side rail portions 22, 24, it may be preferable for the forward side rail portions 16, 18 to be configured such that an outer peripheral surface thereof is shaped to conform to the inner peripheral surface of the rearward side rail portions 22, 24. For example, shown in FIG. 3B, is rearward side rail portion 22 with the rectangular tubular configuration. A preferred configuration of the forward side rail portion to be used in conjunction with this rectangular tubular rearward side rail portion has a similar rectangular tubular configuration of a size sufficiently small to engage within opening 49. However, it is noted that the respective sectional geometries of the forward and rearward side rail portions need not be identical (e.g., both rectangular) to implement the method of the present invention described herein. For example, it may be preferable to nest forward side rail portions with an open sectional configuration (such as a C-shaped configuration) with rearward side rail portions with a closed sectional configuration (such as a rectangular configuration).

Figure 4:
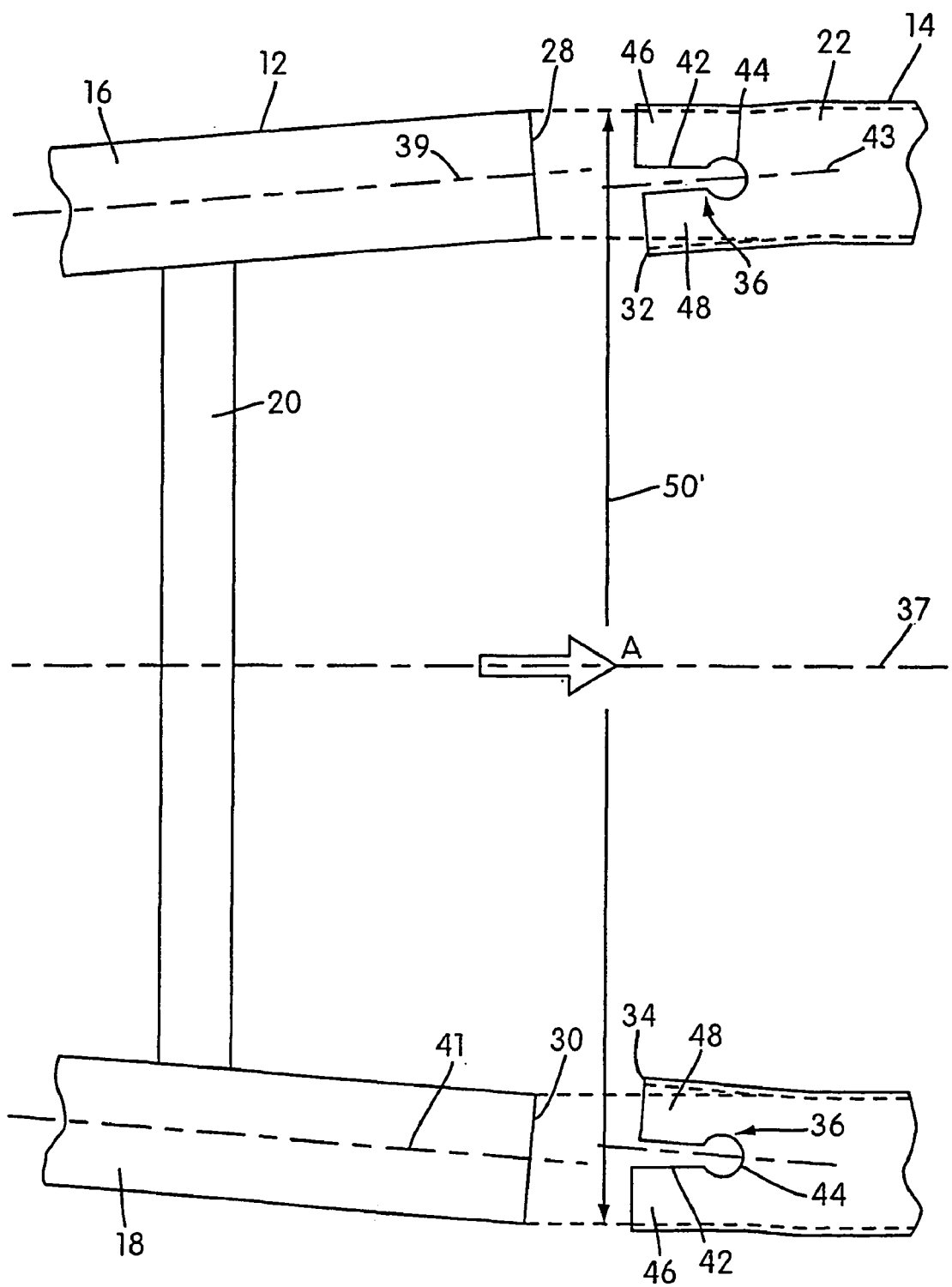
FIG. 4 is a partial top plan view of the forward and rearward modules shown in FIG. 3A, shown with first split portions bent laterally outwardly.

Shown in FIG. 4, to allow telescopic nesting of the front side rail portions 16, 18 within the rearward side rail portions 22, 24, the first split portions 46 are bent laterally outwardly, effectively widening a transverse distance 50, shown in FIG. 3A, of opening 49 to a sufficient relatively greater distance 50', shown in FIG. 4, to allow front side rail portions 16, 18 to engage therein.

The circular cut outs 44 serve as bending points for deflection of material of the rearward side rail portions 22, 24 and allow the first split portions 46 to bend without producing excessive stress concentrations in the material. Since the circular cut outs 44 have smooth peripheries, there are no sharp corners to concentrate stress in the first split portions and stress, produced by the deflection of material, is significantly evenly distributed along the peripheries of circular cut outs 44. Furthermore, the notches 36 allow the first split portions 46 to be bent without excessively thinning, stretching, or buckling the material proximate the notches 36.

Figure 5:
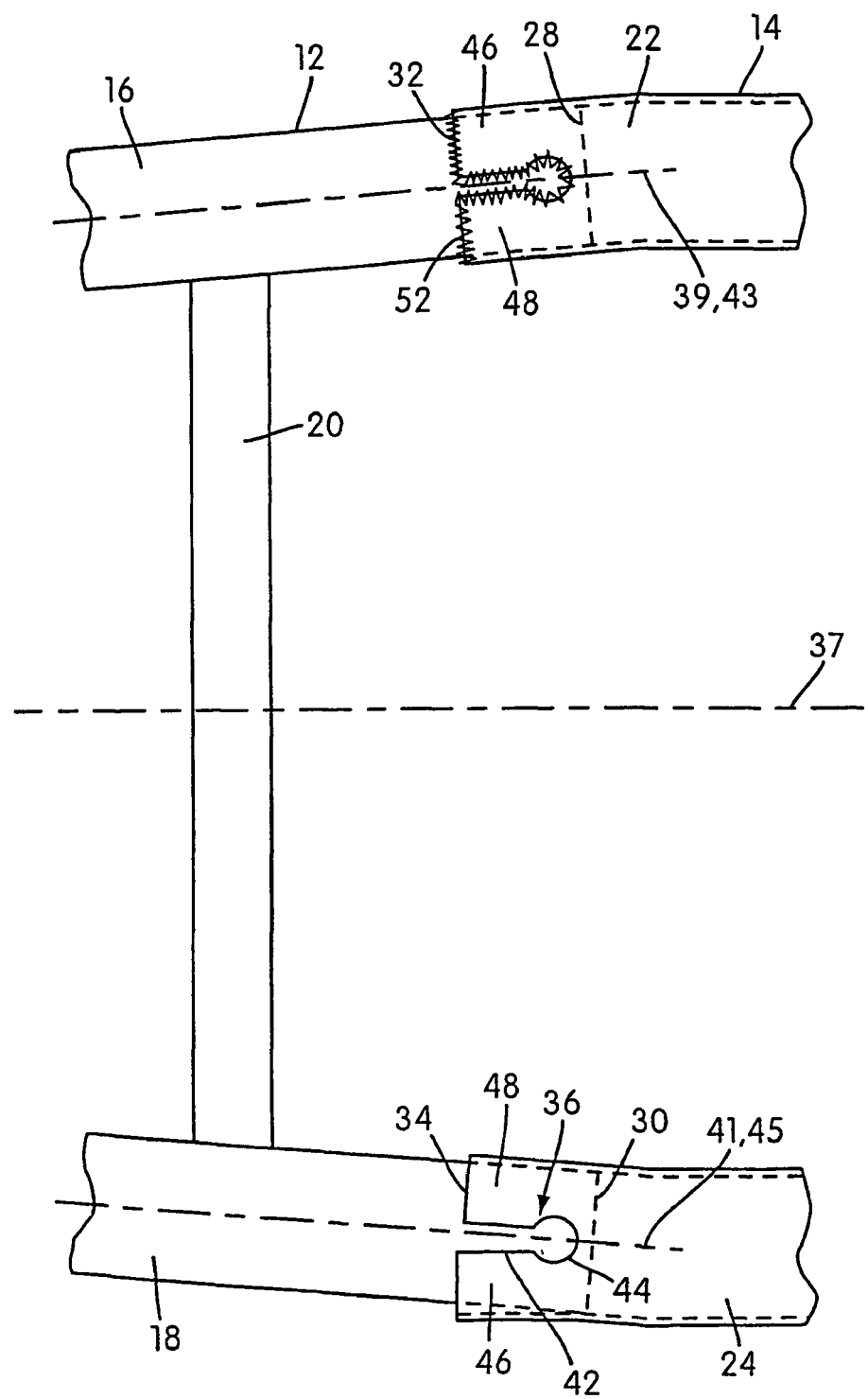
FIG. 5 is a partial top plan view of the forward and rearward modules shown connected with one of the first split portions deflected to its original position and welded.

After the bending operation, forward module 12 is then moved a distance (relative to the rearward module, or vice versa) along the longitudinal axis 37 in the direction indicated by arrow A in FIG. 4, such that the rearward ends 28, 30 of the forward side rails 16, 18 are slidably received within the expanded openings 49 in the forward end portions 32, 34 of the rearward side rail portions 22, 24, as shown in FIG. 5. The first split portions 46 are then both transversely bent back to their original positions, as shown for the first split portion 46 of rearward side rail portion 22 in FIG. 5.

The forward and rearward modules 12, 14 are then welded together, as shown in FIG. 5 at 52 for forward side rail portion 16 and rearward side rail portion 22, effectively securing the modules to each other. It should be appreciated that FIG. 5 is provided for illustrative purposes only, and that it is preferred for both of the first split portions 46 to be bent back to their original positions before they are welded at a separate station. The rearward side rails 22, 24 are also welded at the notches 36 to allow for additional weld connection area and to further secure the connection of the forward and rearward modules 12, 14.

Figure 6:
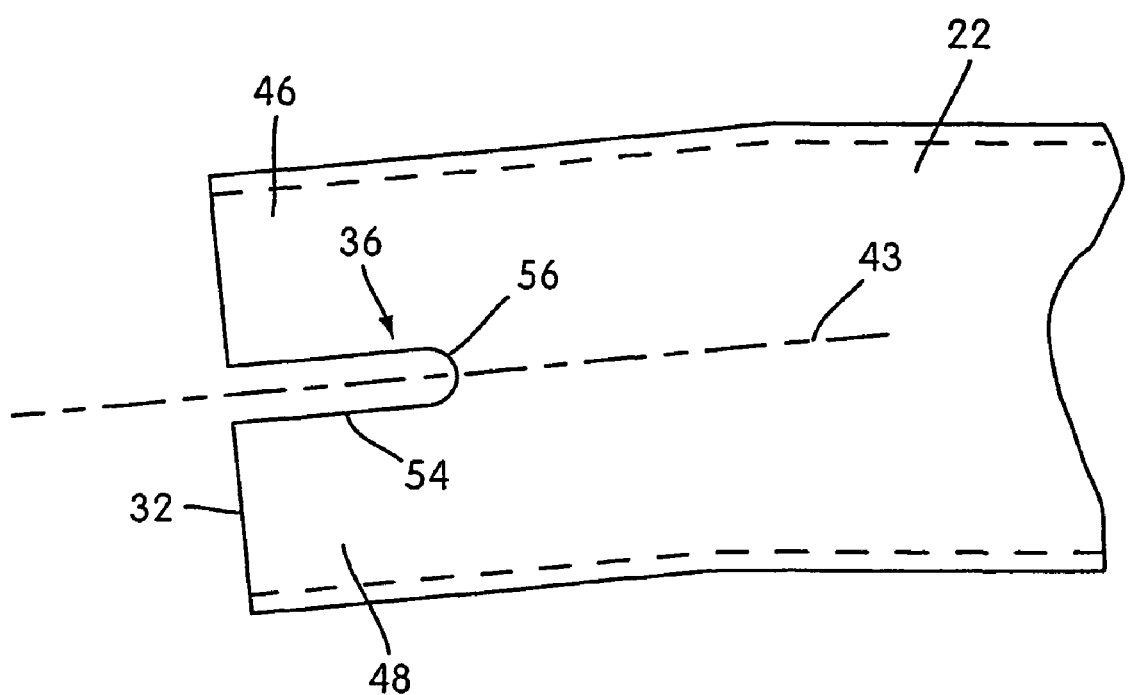
FIGS. 6–8 are top views of alternate embodiments of the notch formed in one of the side rail portions.

As described above, the notches 36 are configured to allow the first split portions 46 to be bent and to reduce stress concentration within and buckling of the material proximate the notches 36. There are various other embodiments of notch 36 that may allow the first split portions 46 to be bent without producing significant stress concentrations or buckling. FIG. 6 shows an embodiment utilizing a substantially straight longitudinally extending slot portion 54. A circular cut out 56 with a diameter substantially equal to the transverse width of the slot portion 54 is formed at a rearward end of the slot portion 54.

Figure 7:
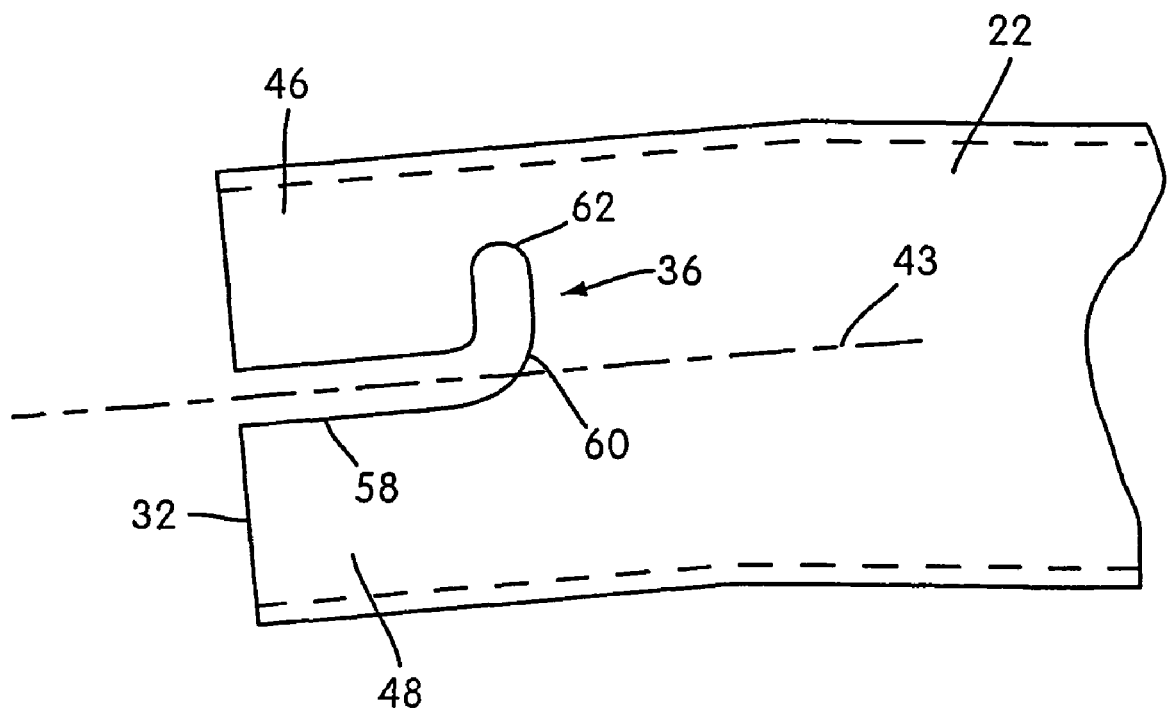

FIG. 7 shows another possible embodiment of the notch 36. The notch of this embodiment includes a generally longitudinally extending portion 58. An arcuate portion 60 is configured such that the notch 36 curves toward the first split portion 46 (laterally outwardly, in other words) and has a curved edge 62 at a rearward end of the notch 36. As shown in FIG. 7, the notch of this embodiment may be generally L-shaped.

Figure 8:
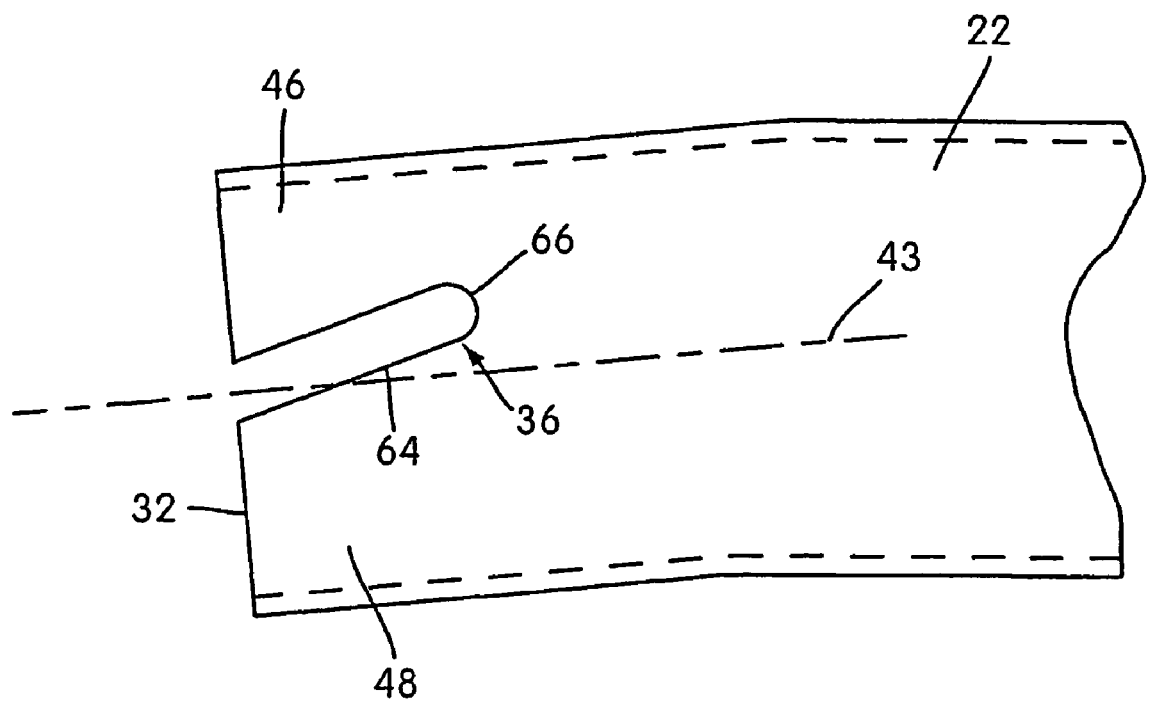

Another embodiment of the notch 36, shown in FIG. 8, includes a generally straight slot portion 64 and a circular cut out portion 66 at a rearward end of the notch 36. The notch 36 is angularly disposed with respect to centroidal axis 43 such that the notch is angled toward the first split portion 46.

Figure 9:
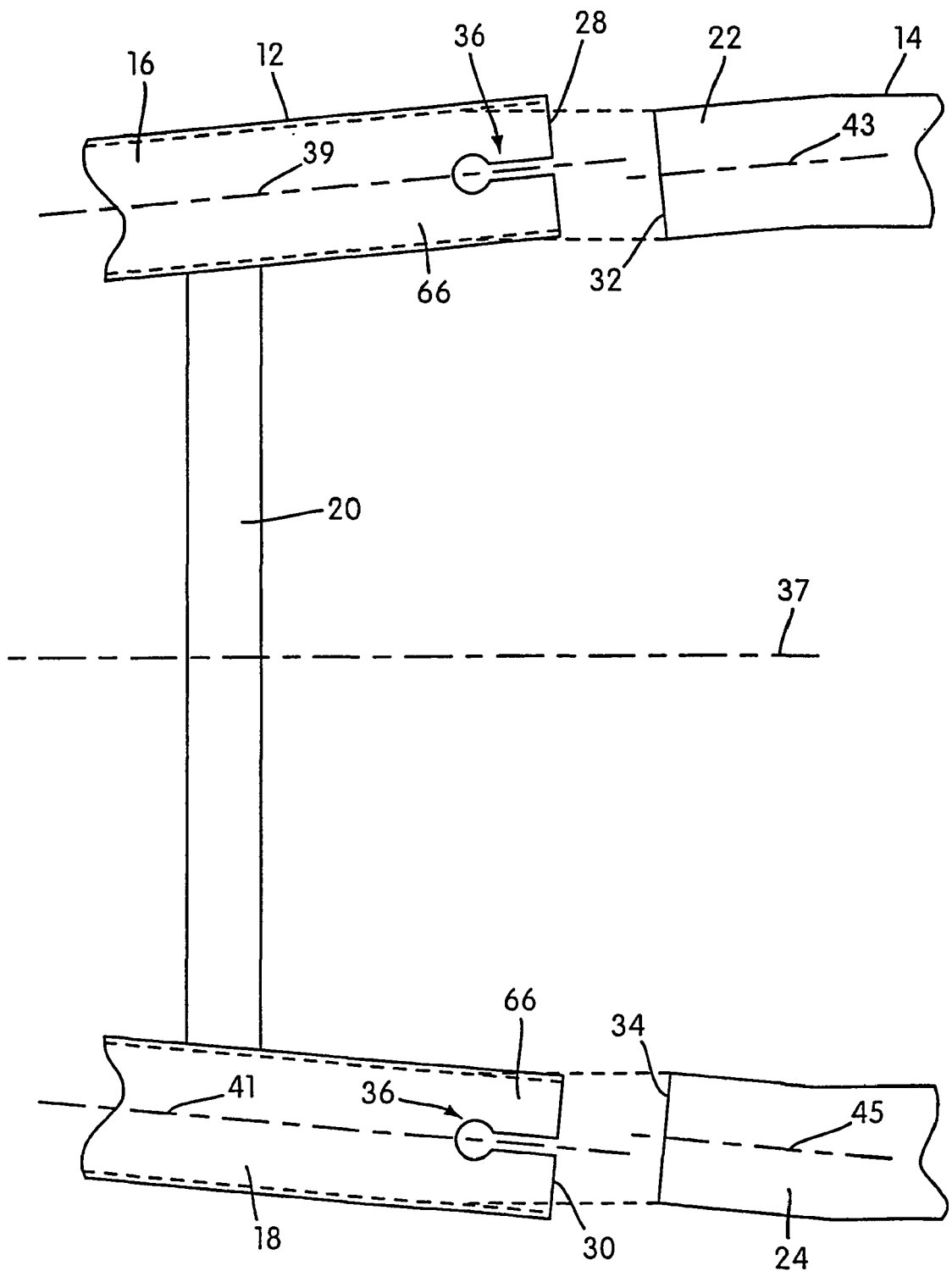
FIG. 9 is a top view of the forward and rearward modules with the notches formed in the forward side rail portions.
Figure 10:
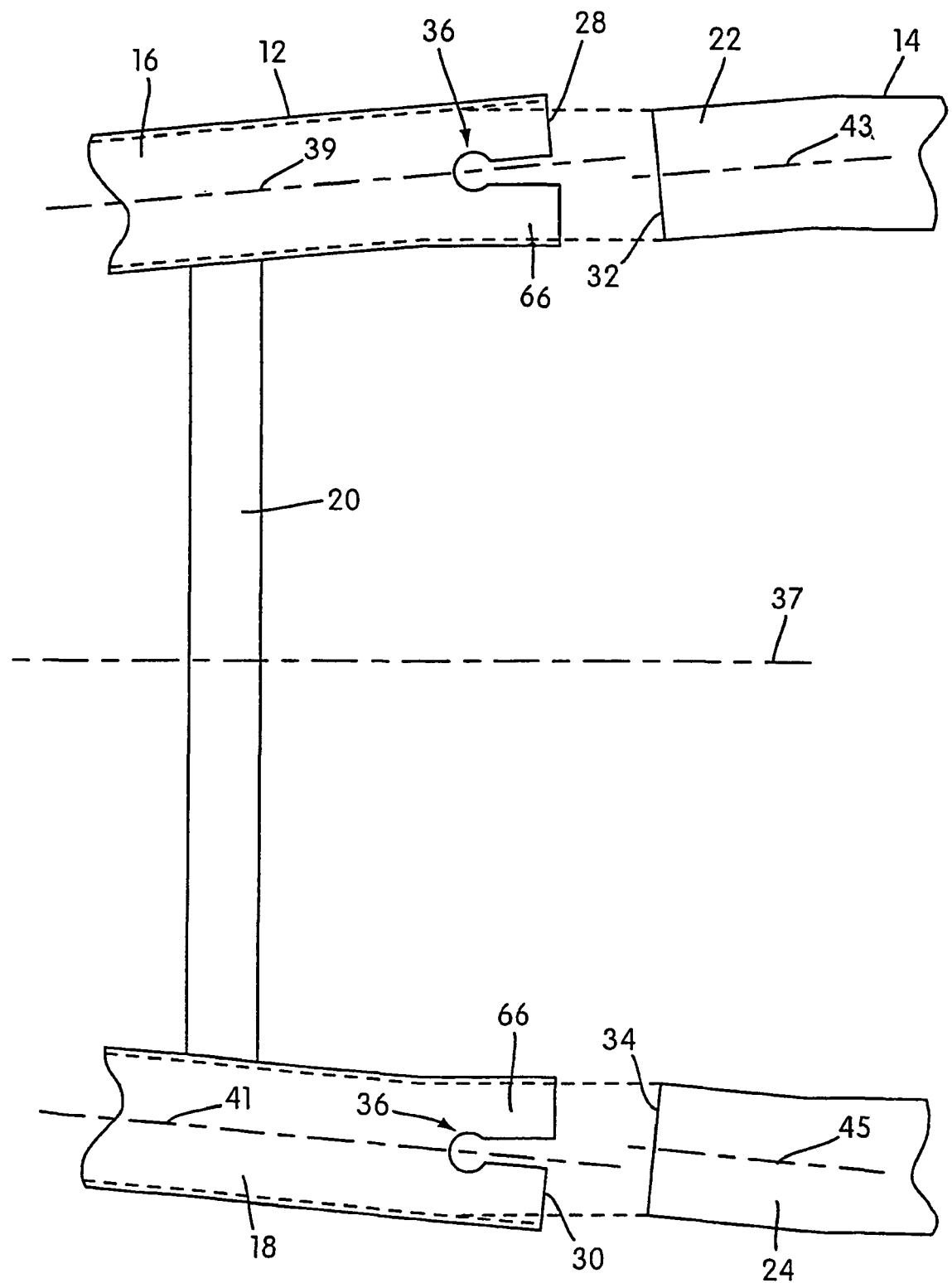
FIG. 10 is a top view of the forward and rearward modules shown in FIG. 9 with the first split portions deflected laterally inwardly.
Figure 11:
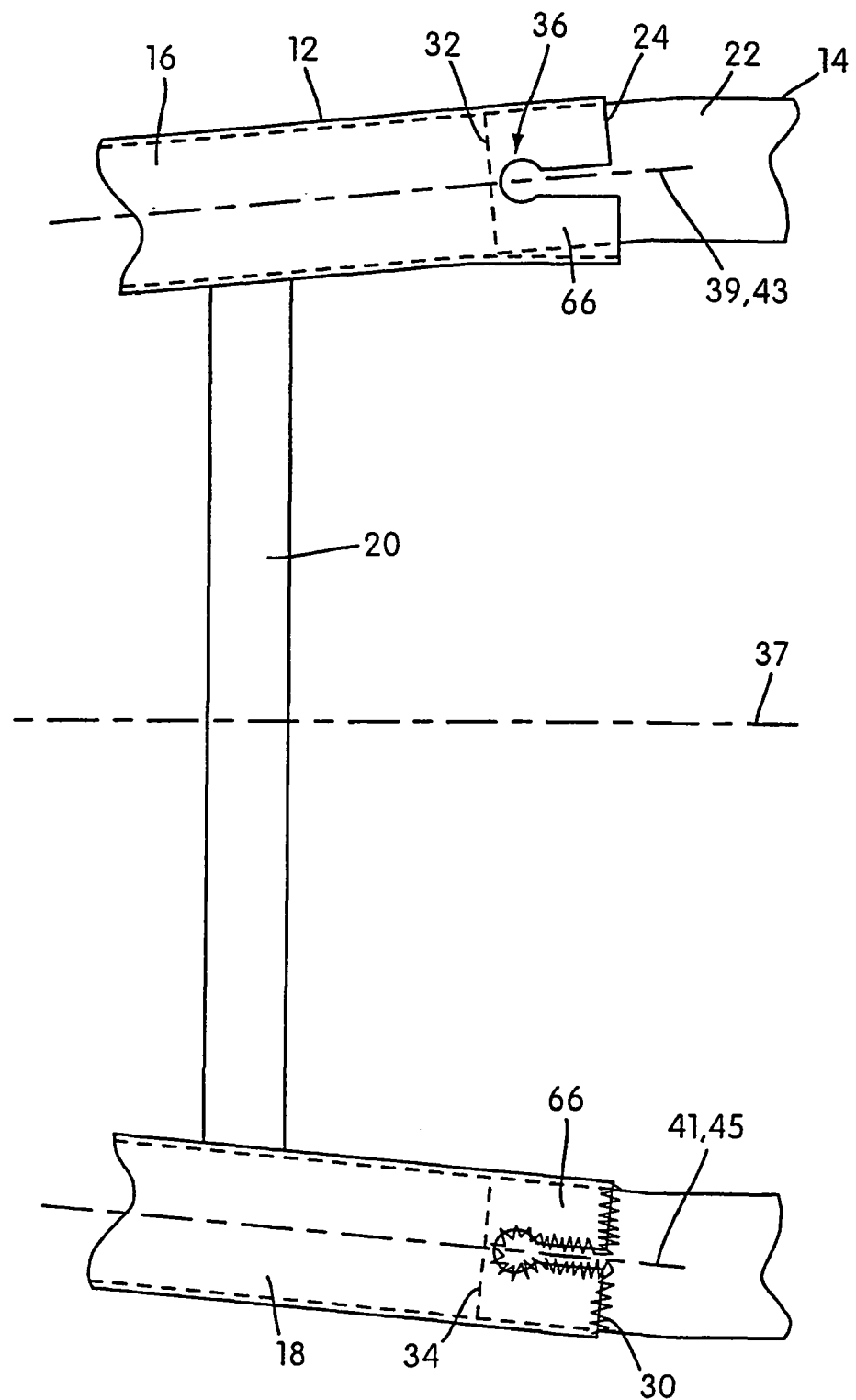
FIG. 11 is a top view of the forward and rearward modules shown in FIG. 10 connected with one of the first split portions deflected to its original position and welded.

It is also contemplated that the notches 36, as described herein above, may be formed in the rearward ends 28, 30 of the forward side rail portions 16, 18, as shown in FIG. 9. The first spilt portions 66 of this embodiment are deflected laterally inwardly, as shown in FIG. 10, such that the rearward side rail portions 22, 24 may be slidably received within an inner periphery of the forward side rail portions 16, 18, as shown in FIG. 11. The first split portions 66 are then deflected laterally outwardly toward their respective original positions, as shown for first split portion 66 of forward side rail portion 18 in FIG. 11. A connection between the forward module 12 and the rearward module 14 is then securely formed by welding, bonding, or mechanical fasteners.

It can be appreciated from the above that in the embodiment where the split portions are provided on the forward ends of the rearward rail portions, the outer split portions are bent outwardly, and where the split portions are provided on the rearward ends of the forward rail portions, the inner split portions are bent inwardly.

As a further embodiment, it is contemplated that only one of the side rails (either one of the forward side rail portions or one of the rearward side rail portions) needs to be provided with a notch and bent laterally. In this case, it would be necessary to bend the single split portion significantly more (for example, about twice as much) as in the case where two frame portions are provided with notches to be bent. As yet another embodiment, it is also possible to provide a notch in a rearward end of a single front side rail member and a notch in a forward end of a single rearward side rail member on opposite sides of the frame. While it is further possible to completely remove the first split portions rather than bend them back prior to welding, however this is not preferred since it would provide less surface area for the welded connection.

A benefit of the present invention is that both prefabricated forward and rearward modules can be formed and assembled, with the forward module including angled side rails. The modules can be attached to one another after assembly thereof, irrespective of the angled geometry of the forward side rails.

While the present invention has been described in relation to the above exemplary embodiments it will be understood that various modifications may be made within the spirit and scope of the invention. While the objects of the present invention have been fully and effectively accomplished, it will be realized, however, that the foregoing exemplary embodiments have been functional and structural principles of this invention and are subject to change without departure from such principles. Therefore, this invention includes all modifications encompassed within the scope of the following claims.

What is claimed is:

1. A frame assembly for a motor vehicle comprising:
   a forward module comprising a pair of forward side rail portions interconnected by a cross portion, said forward side rail portions disposed at an angle with respect to one another such that said forward side rail portions have an increasing distance therebetween as they extend rearwardly;
   a rearward module comprising a pair of rearward side rail portions interconnected by a cross portion,
   rearward ends of said forward side rail portions being connected to associated forward ends of said rearward side rail portions, at least said forward ends of said rearward side rail portions being disposed at the same angle with respect to one another as said forward side rail portions are disposed with respect to each other;
   at least one of said side rail portions comprising a tubular structure having a first notch formed in an end portion thereof to enable connection thereof to the side rail portion associatively connected thereto;
   said first notch forming first and second split portions in said end portion and said first notch includes an open end and a closed end, said open end adjacent a free edge of said end portion and said closed end being an arcuate section providing a bending point enabling said first split portion of said end portion of the at least one side rail portion to be bent laterally to permit widening of said first notch from an original configuration and interface of said end portion with the associated side rail portion connected thereto, and then to permit said first split portion to be bent back toward said original position to permit said first split portion to be welded to the associated side rail portion connected thereto, and said closed end being wider than said open end.

2. A frame assembly according to claim 1, wherein said at least one of said side rail portions comprising a tubular structure further has a second notch formed in said end portion thereof to enable connection thereof to the side rail portion associatively connected thereto, each of said first and second notches having an open end adjacent the free edge of said end portion and a closed end, and said second notch being positioned on an opposite side of said tubular structure from said first notch.

3. A frame assembly according to claim 1, wherein said first notch is generally L-shaped, and said closed end extends transverse to said longitudinally extent of said end portion.

4. A frame assembly according to claim 1, wherein said rearward side rail portions are disposed at a second angle with respect to one another such that said rearward side rail portions have an increasing distance therebetween as they extend rearwardly.

5. A frame assembly according to claim 4, wherein said angle between said forward side rail portions is within about 2° of said second angle between said rearward side rail portions.

6. A frame assembly according to claim 5, wherein said angle between said forward side rail portions is about the same as said second angle between said rearward side rail portions.

7. A frame assembly according to claim 1, wherein said rearward side rail portions are disposed generally parallel to each other and comprise associated forward end portions, which are angled laterally inwardly with respect to associated rearward side rail portions.

8. A frame assembly according to claim 1, wherein said at least one side rail portion having said first notch comprises two side rail portions.

9. A frame assembly according to claim 8, wherein said two side rail portions having said first notch comprises said rearward side rail portions.

10. A frame assembly according to claim 1, wherein said at least one of said side rail portions comprises a front end of a first of said rearward side rail portions.

11. A frame assembly according to claim 10, wherein said at least one of said side rail portions further comprises a front end of a second of said rearward side rail portions.

12. A frame assembly according to claim 1, wherein said at least one of said side rail portions comprises a rearward end of a first of said forward side rail portions, said first of said rearward side rail portions being on an opposite side of said frame assembly relative to said first of said forward side rail portions.

13. A frame assembly according to claim 1, wherein said at least one of said side rail portions comprises a rearward end of a first of said forward side rail portions.

14. A frame assembly according to claim 13, wherein said at least one of said side rail portions further comprises a rearward end of a second of said forward side rail portions.

15. A method of forming a frame assembly for a motor vehicle, comprising:
   providing a forward module comprising a pair of tubular forward side rail portions interconnected by a cross portion, said forward side rail portions disposed at an angle with respect to one another such that said forward side rail portions have an increasing distance therebetween as they extend rearwardly;
   providing a rearward module comprising a pair of tubular rearward side rail portions interconnected by a cross portion,
   connecting said forward module to said rearward module by
   (a) forming a notch in an end of at least one of said side rail portions so as to form first and second split portions;
   (b) bending said first split portion to widen said end of said at least one of said side rail portions to thereby enable said end of said at least one of said side rail portions to receive an associate end of an adjoining one of said side rail portions;
   (c) bending said first split portion back to narrow said widened end of said at least one of said side rail portions; and (d) welding forward ends of said rearward side rail portions to rearward ends of said forward side rail portions.

16. A method according to claim 15, wherein said rearward side rail portions are disposed at an angle with respect to one another such that said rearward side rail portions have an increasing distance therebetween as they extend rearwardly.

17. A method according to claim 15, wherein said rearward side rail portions are disposed generally parallel to each other and comprise associated forward end portions, which are angled laterally inwardly with respect to associated rearward side rail portions.

18. A method according to claim 15, wherein said forming of a notch in an end of at least one of said rail portions comprises forming notches in forward ends of said rearward side rail members.

19. A method of forming a frame assembly for a motor vehicle comprising:

constructing a forward module comprising a pair of forward side rail portions interconnected by a cross portion, said forward side rail portions disposed at an angle with respect to one another such that said forward side rail portions have an increasing distance therebetween as they extend rearwardly, said forward side rail portions having associated rearward ends;

constructing a rearward module comprising a pair of rearward side rail portions interconnected by a cross portion, said rearward side rail portions having associated forward ends; and connecting said forward module with said rearward module after said modules have been constructed, said connecting being accomplished by (a) bending at least one end of said ends so that said rearward ends of said forward side rail portions mate with said forward ends of said rearward side rail portions, and (b) welding said rearward ends to said forward ends.

20. A method according to claim 19, wherein said constructing of said forward module comprises hydroforming said side rail portions from a blank prior to said side rail portions being interconnected by said cross portion.

21. A frame assembly for a motor vehicle comprising:

a forward module comprising a pair of forward side rail portions interconnected by a cross portion, said forward side rail portions disposed at an angle with respect to one another such that said forward side rail portions have an increasing distance therebetween as they extend rearwardly:

a rearward module comprising a pair of rearward side rail portions interconnected by a cross portion, rearward ends of said forward side rail portions being connected to associated forward ends of said rearward side rail portions, at least said forward ends of said rearward side rail portions being disposed at the same angle with respect to one another as said forward side rail portions are disposed with respect to each other;

at least one of said side rail portions comprising a tubular structure having a first notch formed in an end portion thereof to enable connection thereof to the side rail portion associatively connected thereto;

said first notch forming first and second split portions in said end portion and said first notch includes an open end and a closed end, said open end adjacent a free edge of said end portion and said closed end being an arcuate section providing a bending point enabling said first split portion of said end portion of the at least one side rail portion to be bent laterally to permit widening of said first notch from an original configuration and interface of said end portion with the associated side rail portion connected thereto, and then to permit said first split portion to be bent back toward said original position to permit said first split portion to be welded to the associated side rail portion connected thereto, wherein said closed end extends along a longitudinal first notch axis, which is angled with respect to the longitudinal extent of said end portion having said first notch.

* * * * *